US012398860B2

(12) United States Patent
Hikmet et al.

(10) Patent No.: US 12,398,860 B2
(45) Date of Patent: Aug. 26, 2025

(54) HIGH INTENSITY WHITE LIGHT SOURCE WITH GOOD UNIFORMITY BASED ON A PLURALITY OF LIGHT SOURCES

(71) Applicant: SIGNIFY HOLDING B.V., Eindhoven (NL)

(72) Inventors: Rifat Ata Mustafa Hikmet, Eindhoven (NL); Ties Van Bommel, Horst (NL); Hugo Johan Cornelissen, Escharen (NL); Olexandr Valentynovych Vdovin, Maarheeze (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/693,626

(22) PCT Filed: Sep. 19, 2022

(86) PCT No.: PCT/EP2022/075900
§ 371 (c)(1),
(2) Date: Mar. 20, 2024

(87) PCT Pub. No.: WO2023/046616
PCT Pub. Date: Mar. 30, 2023

(65) Prior Publication Data

US 2024/0426462 A1 Dec. 26, 2024

(30) Foreign Application Priority Data

Sep. 21, 2021 (EP) .................................... 21197890

(51) Int. Cl.
*F21V 9/32* (2018.01)
*F21V 5/00* (2018.01)
(Continued)

(52) U.S. Cl.
CPC ................ *F21V 9/32* (2018.02); *F21V 5/007* (2013.01); *F21V 13/08* (2013.01);
(Continued)

(58) Field of Classification Search
CPC ..... G02B 21/204; G02B 21/2013; F21V 9/32; F21V 9/30; F21V 9/35; F21V 5/007;
(Continued)

(56) References Cited

U.S. PATENT DOCUMENTS

2011/0001151 A1 1/2011 Le Toquin
2012/0281293 A1* 11/2012 Gronenborn ............ H01S 5/423 359/619

(Continued)

FOREIGN PATENT DOCUMENTS

WO 2021032721 A1 2/2021

*Primary Examiner* — Erin Kryukova

(57) ABSTRACT

The invention provides a light generating system (1000) comprising: (i) a first set (1100) comprising n1 first light generating devices (110), (ii) a first optical element (410), and (iii) a luminescent body (200), wherein: —the n1 first light generating devices (110) are configured to generate first device light (111); wherein the n1 first light generating devices (110) may be selected from the group of lasers and superluminescent diodes; —the first set (1100) comprises k1 first subsets (1115) of each at least one first light generating device (110) of the n1 first light generating devices (110), wherein n1≥3, especially n1≥5, and 2≤k1≤n1; —the luminescent body (200) is configured to: (i) convert part of the first device light (111) into luminescent material light (211), and (ii) transmit part of the first device light (111); —the n1 first light generating devices (110) and the first optical element (410) are configured to provide first beams (115) of first device light (111) to the luminescent body (200), wherein two or more first beams (115) of two or more first light generating devices (110) of the k1 first subsets (1115) have different first angles of incidence (α1) relative to a (Continued)

normal to the luminescent body (200); and—in an operational mode of the light generating system (1000) a first intensity of the first device light (111) of the k1 first subsets (1115) is dependent upon the first angles of incidence (α1).

15 Claims, 4 Drawing Sheets

(51) Int. Cl.

| | |
|---|---|
| ***F21V 13/08*** | (2006.01) |
| ***F21Y 105/10*** | (2016.01) |
| ***F21Y 113/00*** | (2016.01) |
| ***F21Y 115/30*** | (2016.01) |

(52) U.S. Cl.
CPC ....... *F21Y 2105/10* (2016.08); *F21Y 2113/00* (2013.01); *F21Y 2115/30* (2016.08)

(58) Field of Classification Search
CPC .. F21V 13/08; F21Y 2115/30; F21Y 2105/10; F21K 9/64
See application file for complete search history.

(56) References Cited

U.S. PATENT DOCUMENTS

| | | | | |
|---|---|---|---|---|
| 2013/0292709 | A1 | 11/2013 | Tong et al. | |
| 2017/0365753 | A1* | 12/2017 | Haitz | G02B 19/0028 |
| 2018/0003356 | A1 | 1/2018 | Muster et al. | |
| 2018/0073703 | A1 | 3/2018 | Mueller | |
| 2018/0149955 | A1* | 5/2018 | Akiyama | G03B 21/204 |
| 2018/0210211 | A1* | 7/2018 | Akiyama | G03B 21/2033 |
| 2019/0234570 | A1 | 8/2019 | Sorg | |
| 2019/0257488 | A1* | 8/2019 | Hechtfischer | H01S 5/0087 |
| 2022/0385032 | A1* | 12/2022 | Hara | H01S 5/02253 |

* cited by examiner

HIGH INTENSITY WHITE LIGHT SOURCE WITH GOOD UNIFORMITY BASED ON A PLURALITY OF LIGHT SOURCES

CROSS-REFERENCE TO PRIOR APPLICATIONS

This application is the U.S. National Phase application under 35 U.S.C. § 371 of International Application No. PCT/EP2022/075900, filed on Sep. 19, 2022, which claims the benefit of European Patent Application No. 21197890.3, filed on Sep. 21, 2021. These applications are hereby incorporated by reference herein.

FIELD OF THE INVENTION

The invention relates to a light generating system as well as to a light generating device comprising such light generating system.

BACKGROUND OF THE INVENTION

The variation of the color temperature of emitted light at different viewing angles relative to a LED is known in the art. US20110001151A1, for instance, describes that a common type of LED packaging where a phosphor is introduced over an LED is known as a "glob-in-a-cup" method. An LED chip resides at the bottom of a cup-like recession, and a phosphor containing material (e.g. phosphor particles distributed in an encapsulant such as silicone or epoxy) is injected into and fills the cup, surrounding and encapsulating the LED. The encapsulant material is then cured to harden it around the LED. This packaging, however, can result in an LED package having significant variation of the color temperature of emitted light at different viewing angles with respect to the package. This color variation can be caused by a number of factors, including the different path lengths that light can travel through the conversion material. This problem can be made worse in packages where the phosphor containing matrix material extends above the "rim" of the cup in which the LED resides, resulting in a predominance of converted light emitted sideways into high viewing angles (e.g., at 90 degrees from the optic axis). The result is that the white light emitted by the LED package becomes non-uniform and can have bands or patches of light having different colors or intensities. US20110001151A1 proposes a light emitting diode (LED) package, comprising: at least one LED that emits LED light in an LED emission profile; and a first plurality of scattering particles to scatter a first target wavelength and a second plurality of scattering particles to scatter a second target wavelength different from said first target wavelength, said first and second scattering particles arranged around said LED to scatter said LED light to improve the uniformity of said LED emission profile.

SUMMARY OF THE INVENTION

While white LED sources can give an intensity of e.g. up to about 300 $lm/mm^2$; static phosphor converted laser white sources can give an intensity even up to about 20.000 $lm/mm^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

One of the problems that may be associated with such (laser) light sources is the heat management of the (ceramic) phosphor. Other problems associated with such laser light sources may be the desire to create compact high power devices. Yet further a problem with phosphor-based lighting devices, especially in the transmissive mode, may be a color inhomogeneity, also known as the color-over-angle (CoA) problem or color-over-angle effect. Solutions provided in the prior art, however, may be relatively complex and sensitive to production variations. Further, a possible degradation of light sources, or parts of the phosphor, or of scattering particles in a resin, or of parts of the resin, may also not be solvable with prior art solutions.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

In a first aspect, the invention provides a light generating system ("system") comprising: (i) a first set comprising n1 first light generating devices, (ii) a first optical element, and (iii) a luminescent body. The n1 first light generating devices may be configured to generate first device light. Further, the first set may comprise k1 first subsets of each at least one first light generating device of the n1 first light generating devices. In embodiments, $n1 \geq 3$, especially $n1 \geq 5$. Further, $2 \leq k1 \leq 1$. Especially, the luminescent body is configured to convert part of the first device light into luminescent material light. Further, especially the luminescent body may be configured to transmit part of the first device light. In embodiments, the n1 first light generating devices and the first optical element may be configured to provide first beams of first device light to the luminescent body. Especially, two or more first beams of two or more first light generating devices (from two or more different first subsets) of the k1 first subsets may have different first angles of incidence ($\alpha 1$) relative to a normal to the luminescent body. In an operational mode of the light generating system a first intensity of the first device light of the k1 first subsets is dependent upon the first angles of incidence ($\alpha 1$). Hence, especially the invention provides in embodiments a light generating system comprising: (i) a first set comprising n1 first light generating devices, (ii) a first optical element, and (iii) a luminescent body, wherein: (A) the n1 first light generating devices are configured to generate first device light; (B) the first set comprises k1 first subsets of each at least one first light generating device of the n1 first light generating devices, wherein $n1 \geq 3$, especially $n1 \geq 5$ and $2 \leq k1 \leq n1$; (C) the luminescent body is configured to: (i) convert part of the first device light into luminescent material light, and (ii) transmit part of the first device light; (D) the n1 first light generating devices and the first optical element are configured to provide first beams of first device light to the luminescent body, wherein two or more first beams of two or more first light generating devices (especially from two or more different first subsets) of the k1 first subsets have different first angles of incidence ($\alpha 1$) relative to a normal to the luminescent body; and (E) in an operational mode of the light generating system a first intensity of the first device light of the k1 first subsets is dependent upon the first angles of incidence ($\alpha 1$). The n1 first light generating devices are selected from the group of lasers and superluminescent diodes.

With such system it may be possible to reduce or essentially avoid at least part of color-over-angle problems. The intensity of the first light may be controlled in various directions, whereas the distribution of the converted light may be affected much less by the different angles the first light is provided to the luminescent body. The converted light may e.g. essentially have a Lambertian distribution, essentially irrespective of the direction the first light is provided relative to the luminescent body. However, as the path length may vary over the angle more first light may be converted at larger angles leading to less first light at larger angles and more first light at smaller angles. By attenuating the intensity of first light at smaller angles relative to the first light at larger angles, the color-over-angle problem may at least partly be solved. Hence, a more color homogeneous light, substantially irrespective of the viewing angle, may be obtained with the present invention.

Especially, the system may be configured to generate system light, during an operational mode of the system. Especially, the system light comprises visible light. In specific embodiments, a substantial part, like at least 85%, like at least 90%, more especially at least 95%, such as (essentially) 100% of the spectral power of the system light may be in the visible wavelength range.

As indicated above, the light generating system may especially comprise (i) a first set comprising n1 first light generating devices, (ii) a first optical element, and (iii) a luminescent body.

As will be indicated below, there may be one or more sets. Hence, there is at least a first set. In specific embodiments, there may only be a first set. In yet further embodiments, there may be at least a first set and a second set.

Each set may be configured to generate device light having a specific spectral power distribution. Especially, a substantial part, like at least 85%, like at least 90%, more especially at least 95%, such as (essentially) 100% of the spectral power of the device light of each respective set may be in the visible wavelength range.

Each set may comprise a plurality of light generating devices. The light generating devices are configured to generate the device light (of the respective set).

Each set may comprise subsets. A subset may comprise one or more light generating devices. Different subsets within a set may especially be generated to generate essentially the same spectral power distributions. However, the device light of light generating devices in different subsets may irradiate the luminescent body (see also below) under different angles.

As indicated above, the light generating system may especially comprise (i) a first set comprising n1 first light generating devices.

In specific embodiments (as further elucidated below), the light generating system may further comprise a second set comprising n2 second light generating devices. Especially, the second light generating devices may be configured to generate second device light (having a spectral power distribution different from the first device light).

The first light generating device may comprise one or more (first) light sources, more especially one or more (first) solid state light sources. Further, the first light generating device may comprise optics. Light, i.e. first light source light (from the one or more first light sources), escaping from the one or more light sources may in embodiments be beam shaped via the optics. First device light may especially comprise the first light source light. More especially, the first device light may consist of the (first light source) light of the one or more first light sources.

The second light generating device may comprise one or more (second) light sources, more especially one or more (second) solid state light sources. Further, the second light generating device may comprise optics. Light, i.e. second light source light (from the one or more second light sources), escaping from the one or more light sources may in embodiments be beam shaped via the optics. Second device light may especially comprise the second light source light. More especially, the second device light may consist of the (second light source) light of the one or more second light sources.

Below some general aspects in relation to light sources are described, which may apply for the (light sources of the) first light generating device and the (light sources of the) second light generating device.

The term "light source" may in principle relate to any light source known in the art. It may be a conventional (tungsten) light bulb, a low pressure mercury lamp, a high pressure mercury lamp, a fluorescent lamp, a LED (light emissive diode).

In a specific embodiment, the light source comprises a solid state LED light source (such as a LED or laser diode (or "diode laser")).

The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source May be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . .

. The term “light source” may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms “light source” or “solid state light source” may also refer to a superluminescent diode (SLED).

The term LED may also refer to a plurality of LEDs. Further, the term “light source” may in embodiments also refer to a so-called chips-on-board (COB) light source. The term “COB” especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi-LED chip configured together as a single lighting module.

The term “light source” may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material (“phosphor”) may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance (“remote”) from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape) and a spectral power distribution. The light source light may in embodiments comprise one or more bands, having band widths as known for lasers.

The term “light source” may (thus) refer to a light generating element as such, like e.g. a solid state light source, or e.g. to a package of the light generating element, such as a solid state light source, and one or more of a luminescent material comprising element and (other) optics, like a lens, a collimator. A light converter element (“converter element” or “converter”) may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term “light source” herein may also refer to a light source comprising a solid state light source, such as an LED or a laser diode or a superluminescent diode.

The “term light source” may (thus) in embodiments also refer to a light source that is (also) based on conversion of light, such as a light source in combination with a luminescent converter material. Hence, the term “light source” may also refer to a combination of a LED with a luminescent material configured to convert at least part of the LED radiation, or to a combination of a (diode) laser with a luminescent material configured to convert at least part of the (diode) laser radiation.

In embodiments, the term “light source” may also refer to a combination of a light source, like a LED, and an optical filter, which may change the spectral power distribution of the light generated by the light source. Especially, the “term light generating device” may be used to address a light source and further (optical components), like an optical filter and/or a beam shaping element, etc.

The phrases “different light sources” or “a plurality of different light sources”, and similar phrases, may in embodiments refer to a plurality of solid-state light sources selected from at least two different bins. Likewise, the phrases “identical light sources” or “a plurality of same light sources”, and similar phrases, may in embodiments refer to a plurality of solid-state light sources selected from the same bin.

The term “solid state light source”, or “solid state material light source”, and similar terms, may especially refer to semiconductor light sources, such as a light emitting diode (LED), a diode laser, or a superluminescent diode.

The term “laser light source” especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term “laser” especially refers to a device that emits light through a process of optical amplification based on the stimulated emission of electromagnetic radiation.

Especially, in embodiments the term “laser” may refer to a solid-state laser. In specific embodiments, the terms “laser” or “laser light source”, or similar terms, refer to a laser diode (or diode laser).

Hence, in embodiments the light source comprises a laser light source. In embodiments, the terms “laser” or “solid state laser” or “solid state material laser” may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:$CaF_2$) laser, Er:YAG laser, erbium doped and erbium-ytterbium codoped glass lasers, F-Center laser, holmium YAG (Ho: YAG) laser, Nd:YAG laser, NdCrYAG laser, neodymium doped yttrium calcium oxoborate Nd:$YCa_4O(BO_3)_3$ or Nd:YCOB, neodymium doped yttrium orthovanadate (Nd: $YVO_4$) laser, neodymium glass (Nd:glass) laser, neodymium YLF (Nd:YLF) solid-state laser, promethium 147 doped phosphate glass (147$Pm^{3+}$:glass) solid-state laser, ruby laser ($Al_2O_3$:$Cr_3$), thulium YAG (Tm:YAG) laser, titanium sapphire (Ti:sapphire; $Al_2O_3$:$Ti^{3+}$) laser, trivalent uranium doped calcium fluoride (U:$CaF_2$) solid-state laser, Ytterbium doped glass laser (rod, plate/chip, and fiber), Ytterbium YAG (Yb:YAG) laser, $Yb_2O_3$ (glass or ceramics) laser, etc.

For instance, including second and third harmonic generation embodiments, the light source may comprise one or more of an F center laser, an yttrium orthovanadate (Nd: $YVO_4$) laser, a promethium 147 doped phosphate glass (147$Pm^{3+}$:glass), and a titanium sapphire (Ti:sapphire; $Al_2O_3$:$Ti^{3-}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term "solid state light source", and similar terms, may especially refer to semiconductor light sources, such as a light emitting diode (LED), a diode laser, or a superluminescent diode.

Superluminescent diodes are known in the art. A superluminescent diode may be indicated as a semiconductor device which may be able to emit low-coherence light of a broad spectrum like a LED, while having a brightness in the order of a laser diode.

US2020192017 indicates for instance that with current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission. Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s):Fabrizio Roccaforte, Mike Leszczynski, First published:3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355

A vertical-cavity surface-emitting laser, or VCSEL, is known in the art and may especially be a type of semiconductor laser diode with laser beam emission perpendicular from the top surface, contrary to edge-emitting semiconductor lasers (also in-plane lasers) which emit from surfaces formed by cleaving the individual chip out of a wafer. VCSELs may be tunable in emission wavelength, as known in the art. For instance, Dupont et al., Applied Physics Letters 98 (16):161105-161105-3, DOI:10.1063/1.3569591, or Wendi Chang et al., Applied Physics Letters 105 (7): 073303, DOI:10.1063/1.4893758, or Thor Ansbaek, IEEE Journal of Selected Topics in Quantum Electronics 19 (4): 1702306-1702306, DOI:10.1109/JSTQE.2013.2257164, or C. J. Chang-Hasnain, IEEE Journal of Selected Topics in Quantum Electronics (Volume: 6, Issue: 6, November-December 2000), DOI: 10.1109/2944.902146, all document herein incorporated by reference, describe emission wavelength tunable VCSELs. Especially, with varying electrical voltage, the spectral power distribution of the VCSEL may vary.

A light generating device may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually, see further also below.

As indicated above, the n1 first light generating devices are configured to generate first device light. The n1 first light generating devices are configured to generate first device light having a wavelength selected from the range of 380-495 nm. Especially, the n1 first light generating devices may be configured to generate first device light having centroid wavelength selected from the range of 380-495 nm. Hence, essentially all spectral power of the first device light, especially at least 85%, like at least 90%, more especially at least 95%, such as (essentially) 100%, may be in the wavelength range of 380-495. In embodiments, the centroid wavelength of the first device light may be selected from the range of 380-440 nm (especially violet light). In other embodiments, the centroid wavelength of the first device light may be selected from the range of 440-495 nm (especially blue light).

The term "centroid wavelength", also indicated as $\lambda c$, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c=\Sigma\lambda*I(\lambda)/(\Sigma I(\lambda)$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

Especially, the first set may comprise at least 2, even more especially at least 3, like more especially at least 5 first light generating devices. Further, the first set may comprise at least 2 first subsets. In specific embodiments, the first set consists of 2 subsets. In other embodiments, the first set comprises at least three first subsets. As indicated above, the first light generating devices in the first set may in embodiments essentially be the same in respect of the spectral power distribution generated during operation.

Hence, in embodiments the first set comprises k1 first subsets of each at least one first light generating device of the n1 first light generating devices, wherein $n1\geq 2$, more especially wherein $n1\geq 3$, especially wherein $n1\geq 5$, and $2\leq k1\leq n1$. Especially, the n1 first light generating devices may comprise lasers. Hence, in specific embodiments each first light generating device may comprise a laser diode.

Especially, in embodiments the n1 first light generating devices comprise vertical-cavity surface-emitting lasers (VCSELs). Hence, the first light generating devices may comprise a VCSEL. In specific embodiments, the first light generating devices are provided by a (first) multi-channel VCSEL, like a k1 channel VCSEL.

Here below, first some aspects and embodiments in relation to the luminescent body are described, to return later to aspects and embodiments of the arrangement of the light generating devices and the luminescent body (especially in combination with the first optical element).

The luminescent body comprises a luminescent material. Especially, the luminescent material is configured to convert at least part of the first device light into luminescent material light.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein x1+x2+x3=1, wherein x3>0, wherein 0<x2+x3≤0.2, wherein y1+y2=1, wherein 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein 0<x2+x3≤0.2, wherein y1+y2=1, wherein 0≤y2<0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least A1.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $M_2Si_5N_8$:

$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr, and Ca, especially in embodiments at least Sr. Hence, in embodiments, the luminescent may comprise one or more materials selected from the group consisting of (Ba,Sr,Ca)S:Eu, (Ba, Sr,Ca)$AlSiN_3$:Eu and (Ba,Sr,Ca)$_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})$ $AlSiN_3$. Divalent europium will in general replace divalent cations, such as the above divalent alkaline earth cations, especially Ca, Sr, or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not considering the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)$AlSiN_3$:Eu and (Ba,Sr, Ca)$_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})$ $AlSiN_3$. Divalent europium will in general replace divalent cations, such as the above divalent alkaline earth cations, especially Ca, Sr, or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not considering the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

The luminescent material may be chosen such that an emission band of a full width half maximum (of the luminescent material light) of at least 40 nm, such as at least 50 nm is obtained. For instance, the luminescent material may be chosen such that an emission band of a full width half maximum of at least 60 nm, is obtained. This may e.g. be the case with trivalent cerium comprising garnet luminescent materials (as described herein). Hence, especially the luminescent material may comprise a broad band emitter. The luminescent material may also comprise a plurality of broad band emitters. Especially, when two or more luminescent materials are applied to convert at least part of the first device light and/or at least part of the second device light, at least two of the two or more luminescent materials may be configured to provide respective luminescent material light each having an emission band with full width half maximum (of the luminescent material light) of at least 40 nm, such as at least 50 nm.

Especially, the luminescent material light may comprise visible light. The terms "visible", "visible light" or "visible emission" and similar terms refer to light having one or more wavelengths in the range of about 380-780 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

Especially, the luminescent material is comprised by a luminescent body. The luminescent body may be a layer, like a self-supporting layer. The luminescent body may also be a coating. Especially, the luminescent body may essentially be self-supporting. In embodiments, the luminescent body may be a ceramic body or a single crystalline body. Hence, the luminescent material may in embodiments be provided as ceramic body or a single crystalline body, such as is possible with e.g. cerium comprising garnet luminescent materials (see elsewhere herein). In other embodiments, the luminescent body may comprise a light transmissive body, wherein the luminescent material is embedded. For instance, the luminescent body may comprise a glass body, with luminescent material embedded therein. Or the glass as such may be luminescent. In other embodiments, the luminescent body may comprise a polymeric body, with luminescent material embedded therein.

The luminescent material body may be configured in the reflective mode or in the transmissive mode. In the transmissive mode, it may be relatively easy to have light source light admixed in the luminescent material light, which may be useful for generating the desirable spectral power distribution. In the reflective mode, thermal management may be easier, as a substantial part of the luminescent body may be in thermal contact with a thermally conductive element, like a heatsink or heat spreader. In the reflective mode, a part of the light source light may in embodiments be reflected by the luminescent material and/or a reflector and may be admixed in the luminescent material light. The reflector may be configured downstream of the luminescent material (in the reflective mode).

Especially, the luminescent body is configured in the transmissive mode. Hence, the luminescent body may especially be configured downstream of the first light generating devices. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream". Hence, the luminescent body may be configured in a light receiving relationship with the first light generating devices. The terms "light-receiving relationship" or "light receiving relationship", and similar terms, may indicate that an item may during operation of a source of light (like a light generating device or light generating element or light generating system) may receive light from that source of light. Hence, the item may be configured downstream of that source of light. Between the source of light and the item, optics may be configured.

The luminescent body may have any shape. In general, however, the luminescent body may comprise two essentially parallel faces, defining a height (of the luminescent body). Further, the luminescent body may comprise an edge face, bridging the two essentially parallel faces. The edge face may be curved in one or two dimensions. The edge face may be planar. The luminescent body may have a rectangular or circular cross-section, though other cross-sections may also be possible. The two essentially parallel faces may also be indicated as "main faces", as they may especially provide the largest external area of the luminescent body.

In embodiments, the body has lateral dimensions width or length (W1 or L1) or diameter (D) and a thickness or height (H1). In embodiments, (i) $D \geq H1$ or (ii) and $W1 \geq H1$ and/or $L1 \geq H1$. The luminescent tile may be transparent or light scattering. In embodiments, the tile may comprise a ceramic luminescent material. In specific embodiments, $L1 \leq 10$ mm, such as especially $L1 \leq 5$ mm, more especially $L1 \leq 3$ mm, most especially $L1 \leq 2$ mm. In specific embodiments, $W1 \leq 10$ mm, such as especially $W1 \leq 5$ mm, more especially $W1 \leq 3$ mm, most especially $W1 \leq 2$ mm. In specific embodiments, $H1 \leq 10$ mm, such as especially $H1 \leq 5$ mm, more especially $H1 \leq 3$ mm, most especially $H1 \leq 2$ mm. In specific embodiments, $D \leq 10$ mm, such as especially $D \leq 5$ mm, more especially $D \leq 3$ mm, most especially $D \leq 2$ mm. In specific embodiments, the body may have in embodiments a thickness in the range 50 μm-1 mm. Further, the body may have lateral dimensions (width/diameter) in the range 100 μm-10 mm. In yet further specific embodiments, (i) $D > H1$ or (ii) $W1 > H1$ and $W1 > H1$. Especially, the lateral dimensions like length, width, and diameter are at least 2 times, like at least 5 times, larger than the height. In specific embodiments, the luminescent body has a first length L1, a first height H1, and a first width W1, wherein $H1 \leq 0.5*L1$ and $H1 \leq 0.5*W1$.

Especially, at least part of the first device light is transmitted through the luminescent body. Hence, in embodiments the system light may comprise first device light (and luminescent material light). Therefore, in embodiments the luminescent body may be configured to: (i) convert part of the first device light into luminescent material light, and (ii) transmit part of the first device light.

As indicated above, the system may further comprise a first optical element. The term "first optical element" may also refer to a plurality of (different) first optical elements. Especially, the first light generating devices and the first optical element are configured such that at least two bundles of first device light irradiate the luminescent body under different angles. The at least two bundles of first device light may be provided by at least two first subsets of the k1 first subsets. The directions of the beams may be along the optical axes of the beams.

Especially, the optical axis may be defined as an imaginary line that defines the path along which light propagates through a system starting from the light generating element, here especially the (first) light generating device(s). Especially, the optical axis may coincide with the direction of the light with the highest radiant flux.

The first optical element may be configured to focus the first device light on the luminescent body. In embodiments, the first optical element may comprise a single lens. In embodiments, the first optical element may comprise an optical axis. In specific embodiments, the optical axis of the first optical element may be configured essentially parallel to a normal to the luminescent body. The first optical element may be configured such, that parallel optical axis of a two or more first beams of light of two or more first light generating devices configured upstream of the first optical element, obtain a mutual angle and are not parallel anymore when reaching the luminescent body. Hence, the beams of first device light of the first light generating devices may be provided parallel to the first optical element. However, in other embodiments, two or more first beams of light of two or first light generating devices may be provide with a mutual angle to the first optical element. The mutual angle may in embodiments be larger downstream of the first optical element, as the first optical element may have a focusing function. The normal to the luminescent body may especially be a normal to an upstream face of the luminescent body. This may in embodiments be one of the main faces (see also above).

Therefore, in embodiments the n1 first light generating devices and the first optical element may be configured to provide first beams of first device light to the luminescent body, wherein two or more first beams (especially their optical axes) of two or more first light generating devices (from two or more different first subsets) of the k1 first subsets have different first angles of incidence ($\alpha 1$) relative to a normal to the luminescent body. In specific embodiments, at least two of the two or more first beams of two or more first light generating devices of the k1 first subsets have first angles of incidence ($\alpha 1$) relative to the normal to the luminescent body differing with a mutual angle ($\gamma$) selected from the range of 5-175°, such as 10-135°, like in embodiments selected from the range of 15-135°, such as for instance selected from the range of 15-90°.

In order to compensate in embodiments for the color over angle effect, it may be desirable to provide beams of first radiation to the luminescent body having not only different angle (relative to the normal), but also the intensities of the beams may depend upon the angle. In specific embodiments, in an operational mode of the light generating system a first intensity of the first device light of the k1 first subsets may be dependent upon the first angles of incidence ($\alpha 1$). As indicated above, in embodiments it may be desirable that more slanted beams of first device light may have a higher intensity than less slanted beams, or a beam essentially perpendicular to the luminescent body. In the operational mode the first intensity of the first device light of the k1 first subsets increases with increasing first angle of incidence ($\alpha 1$).

Hence, in specific embodiments less first device light may be irradiating the luminescent body under normal incidence than at large angles. So, not necessarily less first device light in the center of the phosphor (spatial non-uniform), but specifically less perpendicular irradiation (angular non-uniform) in such a way that the non-converted first device light emerges with a wider distribution.

Especially, in embodiments the first device light may be blue light.

In specific embodiments in the operational mode a ratio of a highest first intensity ($I_{1,max}$) and a lowest first intensity ($I_{1,min}$) of the first device light of the k1 first subsets, upstream of the luminescent body is selected from the range of $1.04 \le (I_{1,max}/I_{1,min}) \le 10$. For instance, in embodiments $1.08 \le (I_{1,max}/I_{1,min}) \le 8$.

Herein, the intensities are especially used in relation to each other. However, in embodiments to determine the ratio of two intensities, radiant fluxes may be applied. More especially, irradiance may be applied. The term "radiant flux" may especially refer to the radiant energy emitted per unit time (by the light generating device). Instead of the term "radiant flux", also the terms "intensity" or "radian power" may be applied. The term "radiant flux" may have as unit an energy, like especially Watts. The term "spectral power distribution" especially refers the power distribution of the light (especially in Watts) as function of the wavelength (especially in nanometers), especially in embodiments over the human visible wavelength range (380-780 nm). Especially, the term "spectral power distribution" may refer to a radiant flux per unit frequency or wavelength, often indicated in Watt/nm. Instead of the term "spectral power distribution" also the term "spectral flux" may be applied. Hence, instead of the phrase "controllable spectral power distribution", also the phrase "controllable spectral flux" may be applied. The spectral flux may be indicated as power (Watt) per unit frequency or wavelength. Especially, herein the spectral flux is indicated as the radiant flux per unit wavelength (W/nm). Further, herein spectral fluxes and radiant fluxes are especially based on the spectral power of the device light over the 380-780 nm wavelength range. The term "irradiance" may especially refer to the radiant flux received by a surface per unit area (here, the surface may especially be a surface of the luminescent body).

Though the luminescent body may especially be configured to convert at least part of the first device light, it may also be desirable that at least part of the first device light is transmitted through the luminescent body. Hence, the luminescent body may also be relatively transmissive, or even transparent, for the first device light. Therefore, the luminescent body may have a relatively low scattering for the first device light. In specific embodiments the luminescent body has a body height (H1) and a scattering mean free path (ls) for the first device light, wherein in specific embodiments ls>⅕*H1. For instance, in embodiments the scattering mean free path (ls) for the first device light may be selected from the range of ¼*H1−H1, such as selected from the range of ¼*H1−⅓*H1. Further, in specific embodiments the luminescent body may have a transmission for perpendicularly provided first device light in the range of 5-20%.

Hence, the luminescent body may have an upstream face (see also above), configured in a light receiving relationship with the n1 first light generating devices, and a downstream face from which during the operational mode (a) first device light after transmission through the luminescent body, and (b) luminescent material light, escape. Especially, in embodiments the light generating system may be configured to generate system light, wherein in the operational mode the system light comprises the first device light and the luminescent material light, wherein the first angles of incidence ($\alpha 1$) and the first intensities in the operational mode are selected such that in a plane perpendicular to the downstream side over an angle $\beta$ of at least 90° (in that plane) a color variation in u' or a color variation in v' over the angle is at maximum 0.03. In specific embodiments, this may apply to two perpendicular planes (perpendicular to each other (and especially both perpendicular to the downstream side).

In order to reduce the color over angle effect, the intensity of a perpendicular beam may be lower than of more slanted beams. In specific embodiments, it may be desirable to control the intensities. This may allow adapting of the intensities (such as radiant fluxes) over time. However, this might also allow not only an operational mode wherein the color over angle effect is reduced, or even substantially absent, it might also allow an operational mode wherein—in contrast—the color over angle effect is reduced. In such operational mode, the intensity of a perpendicular beam may be higher than of more slanted beams.

When the intensities of the beam are controller, a control system may be comprised by the system or functionally coupled to the system.

In specific embodiments, the system may further comprise a control system, wherein the k1 first subsets (of each at least one first light generating device of the n1 first light generating devices) are individually controllable, and wherein the control system is configured to control the k1 first subsets. Especially, the control system may be configured to control the radiant flux of the first light generating devices of the first subsets.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In embodiments, it may be desirable to collimate the first device light from the first light generating devices. For instance, this may be the desirable when using laser diodes, which may have relatively broad beams (relatively large beam angles). Hence, in specific embodiments the light generating system may further comprise a second optical element, wherein the second optical element may in embodiments comprises (i) a lens array with m1 lenslets or (ii) collimator element. Especially, the m1 lenslet or the collimator element may be configured downstream of the n1 first light generating devices and upstream of the first optical element. Further, in specific embodiments, m1=n1. Further, in embodiments the m1 lenslets or collimator element may especially be configured to collimate the first device light of the n1 first light generating devices. The second optical element may comprise one or more of a collimator, a lens, and a lens array. For instance, downstream each first light generating devices. Such lenses may be relatively small, and may be indicated as lenslets.

In specific embodiments, the luminescent body may be configured to convert at least part of the first device light into green or yellow (or amber) light. In specific embodiments, the luminescent body may be configured to convert part of the first device light into luminescent material light having a wavelength in the 495-605 nm. In specific embodiments, a substantial part, like at least 85%, like at least 90%, more especially at least 95%, such as (essentially) 100% of the spectral power of the system light may be in the 495-605 nm wavelength range. In embodiments the centroid wavelength may be configured in the 495-605 nm wavelength range. More especially, the centroid wavelength may be configured in the 510-590 nm wavelength range, even more especially in the 570-590 nm wavelength range. Hence, in specific embodiments the first device light may be blue light and the luminescent material light may be yellow light or may comprise a combination of yellow and red light.

As indicated above, the light generating system may further comprise a second set comprising n2 second light generating devices. Especially, the second light generating devices may be configured to generate second device light (having a spectral power distribution different from the first device light). Especially, the second set may comprise k2 second subsets of each at least one second light generating device of the n2 second light generating devices. In specific embodiments n2≥3, especially n2≥5. Further, in embodiments 2≤k2≤n2. Further, in specific embodiments the luminescent body may have a transmission for perpendicularly provided second device light of at least 50%, such as at least about 60%, like in embodiments at least about 65%, such as even at least about 70%. Especially, the n2 second light generating devices and the first optical element may configured to provide second beams of second device light to the luminescent body, wherein two or more second beams of two or more second light generating devices (from two or more different second subsets) of the k2 second subsets may have different second angles of incidence ($\alpha2$) relative to the normal to the luminescent body. In specific embodiments, in an operational mode of the light generating system a second intensity of the second device light of the k2 second subsets may be dependent upon the second angles of incidence ($\alpha2$). Therefore, the invention also provides a light generating system further comprising a second set comprising n2 second light generating devices, wherein: (a) the second light generating devices are configured to generate second device light; (b) the second set comprises k2 second subsets of each at least one second light generating device of the n2 second light generating devices, wherein n2≥3, especially n2≥5 and 2≤k2≤n2; (c) the luminescent body has a transmission for perpendicularly provided second device light of at least 50%, such as at least about 60%, like in embodiments at least about 65%, such as even at least about 70%; (d) the n2 second light generating devices and the first optical element are configured to provide second beams of second device light to the luminescent body, wherein two or more second beams of two or more second light generating devices (from two or more different second subsets) of the k2 second subsets have different second angles of incidence ($\alpha2$) relative to the normal to the luminescent body; and (e) in an operational mode of the light generating system a second intensity of the second device light of the k2 second subsets is dependent upon the second angles of incidence ($\alpha2$).

In embodiments, the n2 second light generating devices may be configured to provide second device light having a wavelength in the 605-780 nm. Especially, the n2 second light generating devices may be configured to generate second device light having centroid wavelength selected from the range of 605-780 nm. Hence, essentially all spectral power of the second device light, especially at least 85%, like at least 90%, more especially at least 95%, such as (essentially) 100%, may be in the wavelength range of 605-780 nm. Especially, the centroid wavelength may be in the 605-680 nm wavelength range, such as in the wavelength range of 610-650 nm.

Especially, the second set may comprise at least 2, even more especially at least 3, like more especially at least 5 second light generating devices. Further, the second set may comprise at least 2 second subsets. In specific embodiments, the second set consists of 2 subsets. In other embodiments, the second set comprises at least three second subsets. As indicated above, the second light generating devices in the second set may in embodiments essentially be the same in respect of the spectral power distribution generated during operation.

Especially, the n2 second light generating devices may comprise lasers. Hence, in specific embodiments each second light generating device may comprise a laser diode. Especially, in embodiments the n2 second light generating devices comprise vertical-cavity surface-emitting lasers (VCSELs). Hence, the second light generating devices may comprise a VCSEL. In specific embodiments, the second light generating devices are provided by a (second) multichannel VCSEL, like a k1 channel VCSEL. Hence, one or more of the following may apply: (i) the n1 first light generating devices comprise vertical-cavity surface-emitting lasers, and (ii) the n2 second light generating devices comprise vertical-cavity surface-emitting lasers.

In embodiments, it may be desirable to collimate the first device light from the first light generating devices. For instance, this may be the desirable when using laser diodes. To this end, also a second optical element as described above, may be applied, but then especially dedicated to the second light generating devices.

In contrast to the first device light, in the (first) operational mode second device light may be provided with higher intensities under essentially perpendicular angles and at lower intensities at more slanted angles. In specific embodiments, in the operational mode the second intensity of the second device light of the k2 second subsets decreases with increasing second angle of incidence ($\alpha2$).

The first device light and the second device light may be combined before reaching the first optical element. Hence, in specific embodiments the system may further comprise a third optical element, wherein the third optical element may comprise a beam combiner, wherein the third optical element is configured downstream of the n1 first light generating devices and the n2 second light generating devices, and upstream of the first optical element, and wherein the third optical element is configured to combine the first device light and the second device light. In embodiments, the beam combiner may comprise a polarizing beam splitter. In embodiments, the beam combiner may comprise a dichroic beam combiner. Yet, in embodiments the beam combiner may comprise a diffractive grating.

The system light may in embodiments in the operational mode comprise white light. More especially, in further specific embodiments, the system light may be white light in an operational mode. The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support one or more of the first light generating devices, the first optical element, and the luminescent body, and optionally also one or more of the second light generating devices and one or more further optical elements.

The terms "visible", "visible light" or "visible emission" and similar terms refer to light having one or more wavelengths in the range of about 380-780 nm. Herein, UV may especially refer to a wavelength selected from the range of 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission", and similar terms, especially relate to light having a wavelength in the range of about 380-440 nm. In specific embodiments, the violet light may have a centroid wavelength in the 380-440 nm range. The terms "blue light" or "blue emission", and similar terms, especially relate to light having a wavelength in the range of about 440-490 nm (including some violet and cyan hues). In specific embodiments, the blue light may have a centroid wavelength in the 440-490 nm range. The terms "green light" or "green emission", and similar terms, especially relate to light having a wavelength in the range of about 490-560 nm. In specific embodiments, the green light may have a centroid wavelength in the 490-560 nm range. The terms "yellow light" or "yellow emission", and similar terms, especially relate to light having a wavelength in the range of about 560-590 nm. In specific embodiments, the yellow light may have a centroid wavelength in the 560-590 nm range. The terms "orange light" or "orange emission", and similar terms, especially relate to light having a wavelength in the range of about 590-620 nm. In specific embodiments, the orange light may have a centroid wavelength in the 590-620 nm range. The terms "red light" or "red emission", and similar terms, especially relate to light having a wavelength in the range of about 620-750 nm. In specific embodiments, the red light may have a centroid wavelength in the 620-750 nm range. The term "cyan light" or "cyan emission", and similar terms, especially relate to light having a wavelength in the range of about 490-520 nm. In specific embodiments, the cyan light may have a centroid wavelength in the 490-520 nm range. The term "amber light" or "amber emission", and similar terms, especially relate to light having a wavelength in the range of about 585-605 nm, such as about 590-600 nm. In specific embodiments, the amber light may have a centroid wavelength in the 585-605 nm range.

In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram. Especially, different spectral power distributions may in embodiments refer to light having different color points.

The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
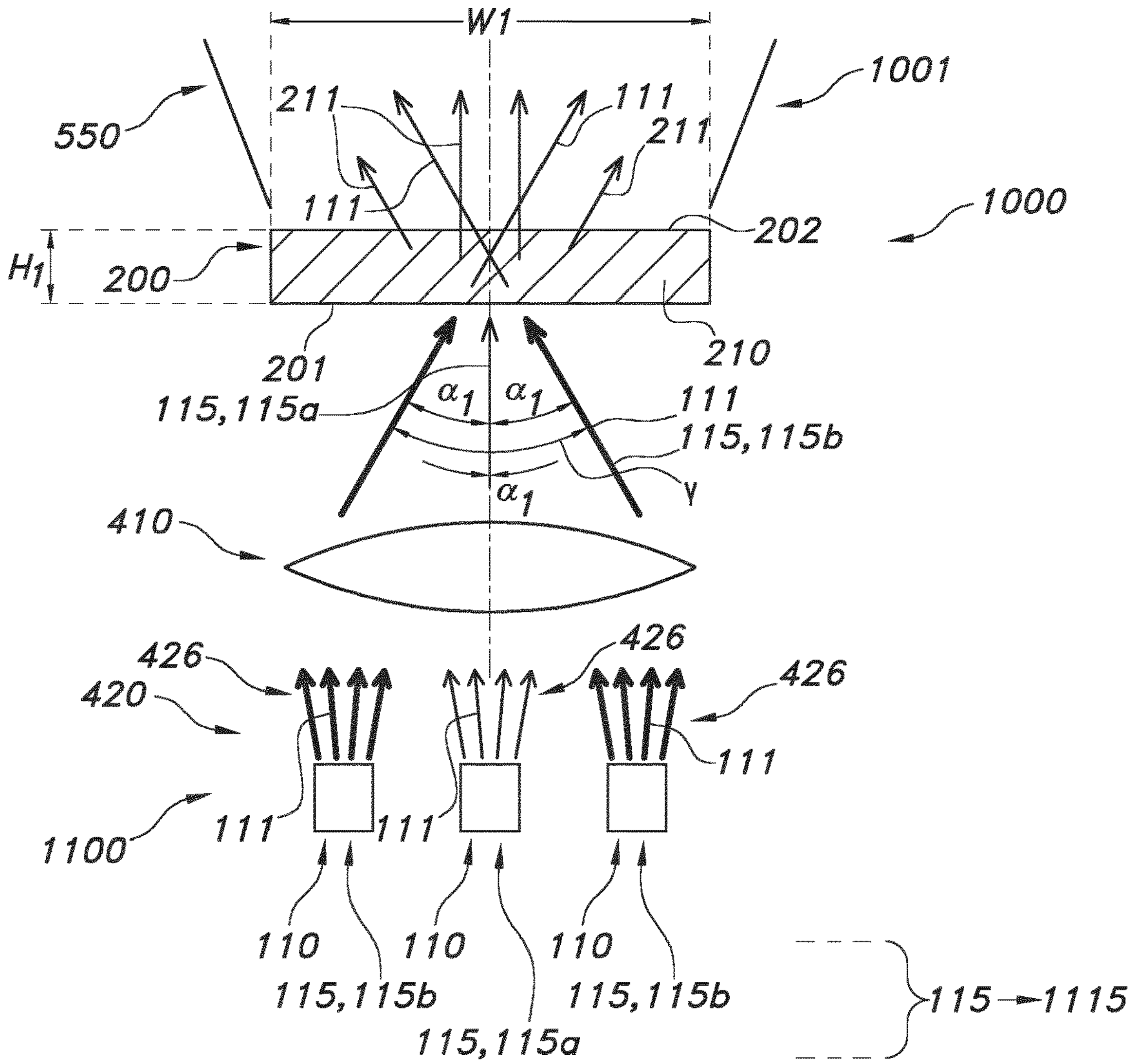
FIG. 1 schematically depicts an embodiment.

FIG. 1 schematically depicts an embodiment of a light generating system 1000 comprising: (i) a first set 1100 comprising n1 first light generating devices 110, (ii) a first optical element 410, and (iii) a luminescent body 200.

The n1 first light generating devices 110 are configured to generate first device light 111. The first set 1100 may comprise k1 first subsets 1115 of each at least one first light generating device 110 of the n1 first light generating devices 110. Especially, n1≥3, especially n1≥5 and 2≤k1≤n1. Here, two subsets 1115 are schematically depicted, one indicated as first subset 1115*a* and one indicated as second subset 1115*b*. Here, in this schematic cross-sectional drawings. The first subset 1115*a* comprises at least a single first light generating devices 110 and the second subset 1115*b* comprises at least two first light generating devices 110.

In embodiments of the light generating system 1000, the n1 first light generating devices 110 comprise lasers.

Especially, the n1 first light generating devices 110 are configured to generate first device light 111 having a wavelength selected from the range of 380-495 nm. The luminescent body 200 may be configured to: (i) convert part of the first device light 111 into luminescent material light 211, and (ii) transmit part of the first device light 111.

The n1 first light generating devices 110 and the first optical element 410 are configured to provide first beams 115 of first device light 111 to the luminescent body 200, two or more first beams 115 of two or more first light generating devices 110 (from two or more different first subsets 1115) of the k1 first subsets 1115 have different first angles of incidence al relative to a normal to the luminescent body 200. A first beam 115*a* may be based on the first light generating device(s) 110 of the first subset 1115*a*, and the second beams 115*b* may be based on the first light generating devices 110 of the second subset 1115*b*. The beams 115 downstream of the first optical element 410 may be characterized by their optical axes, which may have the respective first angles of incidence al with a normal to the luminescent body 200. The first angles of incidence al is essentially 0° for the first beam 115*a*, and the first angles of incidence al may be approximately 25° in this schematical drawing.

In an operational mode of the light generating system 1000 a first intensity of the first device light 111 of the k1 first subsets 1115 may be dependent upon the first angles of incidence al. In specific embodiments (of the light generating system 1000), in the operational mode the first intensity of the first device light 111 of the k1 first subsets 1115 increases with increasing first angle of incidence $\alpha 1$. Schematically, the slanted beams 115*b* are depicted with thicker arrows, indicating a higher intensity, than the essentially parallel to normal propagating beam 115*a*.

Especially, at least two of the two or more first beams 115 of two or more first light generating devices 110 of the k1 first subsets 1115 have first angles of incidence ($\alpha 1$) relative to the normal to the luminescent body 200 differing with a mutual angle $\gamma$ selected from the range of 15-135°. Note that here three angles of incidence are shown, or three optical axes, with the two beams having an angle al with the normal. Note that it is not necessary that these two beams have the same angle of incidence. However, in embodiments symmetric configurations may be chosen.

In specific embodiments, in the operational mode a ratio of a highest first intensity ($I_{1,max}$) and a lowest first intensity ($I_{1,min}$) of the first device light 111 of the k1 first subsets 1115, upstream of the luminescent body 200 may be selected from the range of $1.04 \leq (I_{1,max}/I_{1,min}) \leq 10$.

In embodiments, the luminescent body 200 has a body height H1 and a scattering mean free path ls for the first device light 111. Especially, ls>¼*H1. The width is indicated with reference W1. The width W1 may in specific embodiments be a diameter D. In rectangular embodiments, there may be a length L1 perpendicular to the width W1 and the height H1 (see also FIG. 2*b*).

In embodiments, the luminescent body 200 may comprise a single crystalline body or a ceramic body.

In embodiments, the luminescent body 200 has a transmission for perpendicularly provided first device light 111 in the range of 5-20%.

The luminescent body 200 may be configured to convert part of the first device light 111 into luminescent material light 211 having a wavelength in the 495-605 nm.

Especially, the luminescent body 200 has an upstream face 201, configured in a light receiving relationship with the n1 first light generating devices 110, and a downstream face 202 from which during the operational mode (a) first device light 111 after transmission through the luminescent body 200, and (b) luminescent material light 211, escape. The upstream face 201 and the downstream face 202 may also be indicated as main faces. The main faces may be bridged by and edge. A cross-section of the luminescent body 200, parallel to one of the main faces may e.g. be circular or rectangular.

The light generating system 1000 may be configured to generate system light 1001. In the operational mode the system light 1001 may comprise the first device light 111 and the luminescent material light 211. In embodiments, in the operational mode the system light 1001 may be white light.

In specific embodiments the light generating system 1000 may further comprising a control system 300.

In embodiments, the k1 first subsets 1115 (of each at least one first light generating device 110 of the n1 first light generating devices 110) may individually be controllable. The control system 300 may be configured to control the k1 first subsets 1115.

Figure 2A:
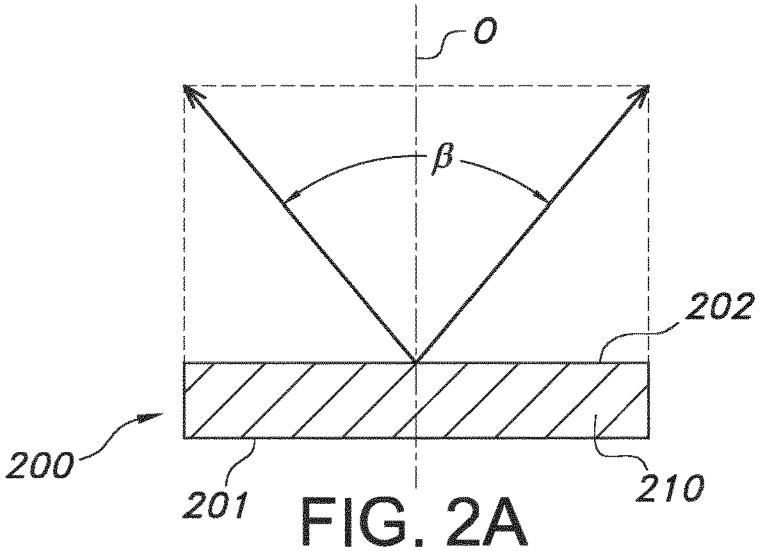
FIG. 2*a*-2*b* schematically depict some aspects.

Referring also to FIG. 2*a*, in embodiments, the first angles of incidence ($\alpha 1$) and the first intensities in the operational mode are selected such that in a plane perpendicular to the downstream side over an angle $\beta$ of at least 90° (in that plane) a color variation in u' or a color variation in v' over the angle may be at maximum 0.03.

Figure 2B:
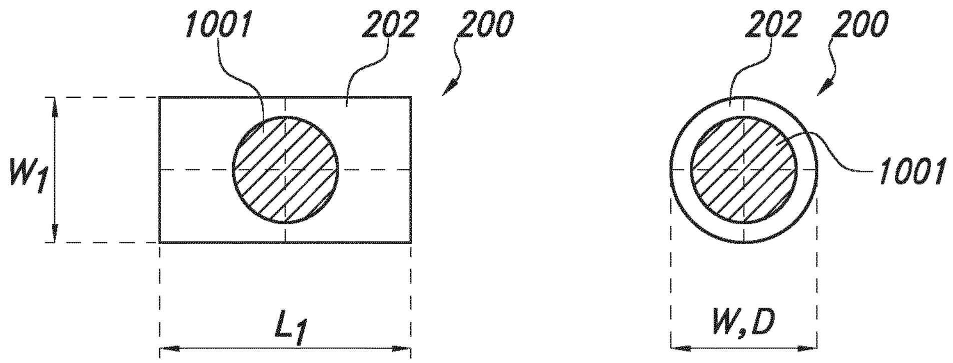

FIG. 2*b* (see also FIG. 1) schematically depicts top view of possible luminescent bodies 200, with the dashed lines indicated plane perpendicular to the downstream side 202 of the luminescent body. Left a rectangular luminescent body 200 is depicted and right a circular luminescent body 200 is depicted. Other shapes may also be possible. The dashed circle indicates luminescent light and device light escaping from the downstream side 202 of the luminescent body 200. This may be system light 1001.

Figure 3:
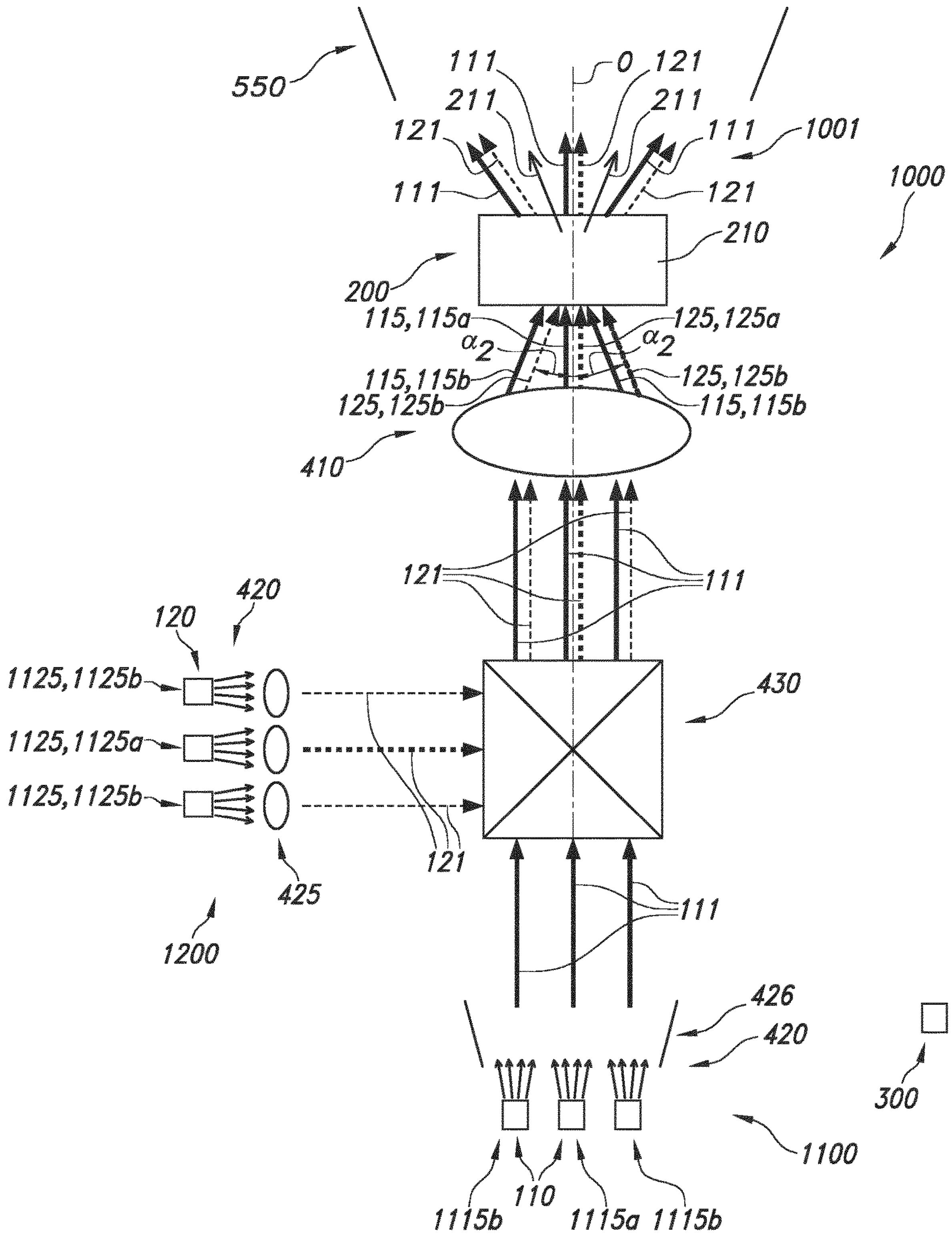
FIG. 3 schematically depicts an embodiment of a light generating system.

Referring also to FIG. 3, in embodiments the light generating system 1000 may further comprise a second optical element 420. The second optical element 420 may comprise a lens array with m1 lenslets 425 or collimator element 426. The m1 lenslet 425 or collimator element 426 may be configured downstream of the n1 first light generating devices 110 and upstream of the first optical element 410. In embodiments, m1=n1. In embodiments, the m1 lenslets 425 or collimator element 426 may be configured to collimate the first device light 111 of the n1 first light generating devices 110.

In specific embodiments, the light generating system 1000 may further comprise a second set 1200 comprising n2 second light generating devices 120. The second light generating devices 120 may be configured to generate second device light 121 (having a spectral power distribution different from the first device light 111).

The second set 1200 may comprise k2 second subsets 1125 of each at least one second light generating device 120 of the n2 second light generating devices 120. In embodiments, n2≥3, especially n2≥5. Especially, in embodiments 2≤k2≤n2.

In embodiments, the luminescent body 200 has a transmission for perpendicularly provided second device light 111 of at least 50%.

The n2 second light generating devices 120 and the first optical element 410 are configured to provide second beams 125 of second device light 121 to the luminescent body 200.

Two or more second beams 125 of two or more second light generating devices 120 (from two or more different second subsets 1125) of the k2 second subsets 1125 have different second angles of incidence $\alpha 2$ relative to the normal to the luminescent body 200.

In an operational mode of the light generating system 1000 a second intensity of the second device light 121 of the k2 second subsets 1125 may be dependent upon the second angles of incidence $\alpha 2$. Especially, in the operational mode the second intensity of the second device light 121 of the k2 second subsets 1125 may decrease with increasing second angle of incidence $\alpha 2$. This is schematically indicated with the dashed lines, where more intensity is in the more perpendicular beam and less intensity is in the more slanted beams.

In embodiments, the n2 second light generating devices 120 comprise lasers.

Here, by way of example the first set 1100 has now a collimator element 426 configured downstream thereof, and the second set 1200 has m1 lenslets 425 configured downstream thereof. Of course, other embodiments may also be possible.

Referring to especially FIGS. 1 and 3, one or more of the following may apply: (i) the n1 first light generating devices 110 comprise vertical-cavity surface-emitting lasers, and (ii) the n2 second light generating devices 120 comprise vertical-cavity surface-emitting lasers.

In specific embodiments, the n2 second light generating devices 120 may be configured to provide second device light 121 having a wavelength in the 605-780 nm.

Referring to FIG. 3, the light generating system 1000 may further comprise a third optical element 430. The third optical element may comprise a beam combiner. The third optical element 430 may be configured downstream of the n1 first light generating devices 110 and the n2 second light generating devices 120, and upstream of the first optical element 410. The third optical element 430 may be configured to combine the first device light 111 and the second device light 121.

Optical modelling was performed, which showed that a substantial reduction in the color over angle effect could be obtained.

Figure 4:
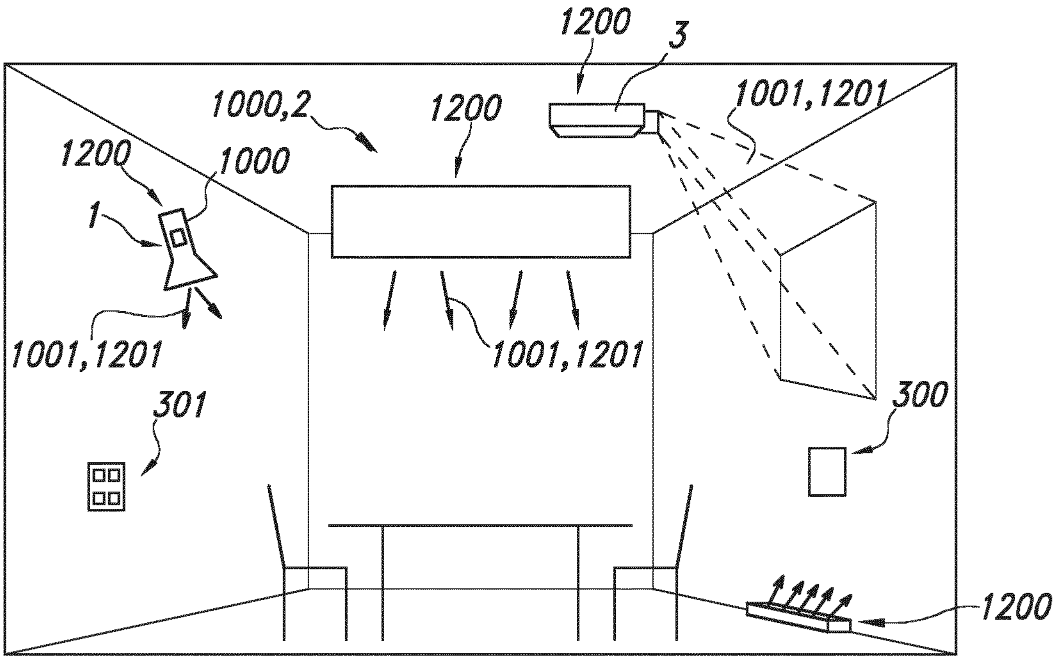
FIG. 4 schematically depict some embodiments and applications.

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 4 schematically depicts embodiments of a lighting device 1200 selected from the group of a lamp 1, a luminaire 2, a projector device 3, a disinfection device, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001.

Referring to the preceding Figures, in specific embodiments, in the operational mode the first intensity of the first device light 111 of the k1 first subsets 1115 may increase with increasing first angle of incidence ($\alpha 1$), the n1 first light generating devices 110 comprise lasers, and the light generating device 1200 may be configured to generate white light 1201 having a CCT selected from the range of 2700-4000 k and having a CRI of at least 80.

The term “plurality” refers to two or more.

The terms “substantially” or “essentially” herein, and similar terms, will be understood by the person skilled in the art. The terms “substantially” or “essentially” may also include embodiments with “entirely”, “completely”, “all”, etc. Hence, in embodiments the adjective substantially or essentially may also be removed. Where applicable, the term “substantially” or the term “essentially” may also relate to 90% or higher, such as 95% or higher, especially 99% or higher, even more especially 99.5% or higher, including 100%.

The term “comprise” also includes embodiments wherein the term “comprises” means “consists of”.

The term “and/or” especially relates to one or more of the items mentioned before and after “and/or”. For instance, a phrase “item 1 and/or item 2” and similar phrases may relate to one or more of item 1 and item 2. The term “comprising” may in an embodiment refer to “consisting of” but may in another embodiment also refer to “containing at least the defined species and optionally one or more other species”.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb “to comprise” and its conjugations does not exclude the presence of elements or steps other than those stated in a claim. Unless the context clearly requires otherwise, throughout the description and the claims, the words “comprise”, “comprising”, and the like are to be construed in an inclusive sense as opposed to an exclusive or exhaustive sense; that is to say, in the sense of “including, but not limited to”.

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising: (i) a first set of light generating devices comprising n1 light generating devices, (ii) a first optical element, and (iii) a luminescent body, wherein:

the n1 first light generating devices are configured to generate first device light; wherein the n1 first light generating devices are selected from the group of lasers and super luminescent diodes, and wherein the n1 first light generating devices are configured to generate first device light having a wavelength selected from the range of 380-495 nm;

the n1 first light generating devices of the first set of light generating devices are divided into k1 first subsets, wherein n1≥3, and 2≤k1≤n1;

the luminescent body is configured to: (i) convert part of the first device light into luminescent material light, and (ii) transmit part of the first device light;

the n1 first light generating devices and the first optical element are configured to provide first beams of first device light to the luminescent body, wherein two or more first beams of two or more first light generating devices from two or more different first subsets of the k1 first subsets have different first angles of incidence (α1) relative to a normal to the luminescent body;

in an operational mode of the light generating system a first intensity of the first device light of the k1 first subsets increases with increasing first angle of incidence (α1); and wherein in the operational mode a ratio of a highest first intensity (I1,max) and a lowest first intensity (I1,min) of the of the first device light of the k1 first subsets, upstream of the luminescent body is selected from the range of 1.04≤(I1,max/I1,min)≤10.

2. The light generating system according to claim 1, wherein in the operational mode at least two of the two or more first beams of two or more first light generating devices of the k1 first subsets have first angles of incidence (α1) relative to the normal to the luminescent body differing with a mutual angle (γ) selected from the range of 15-135°.

3. The light generating system according to claim 1, wherein the n1 first light generating devices are selected from the group of lasers.

4. The light generating system according to claim 1, wherein the luminescent body has a body height (H1) and a scattering mean free path (Is) for the first device light, wherein 1s>⅓*H1.

5. The light generating system according to claim 1, wherein the luminescent body has a transmission for perpendicularly provided first device light in the range of 5-20%; wherein the luminescent body is configured to convert part of the first device light into luminescent material light having a wavelength in the range of 495-605 nm.

6. The light generating system according to claim 1, further comprising a control system, wherein the k1 first subsets are individually controllable, and wherein the control system is configured to control the k1 first subsets.

7. The light generating system according to claim 1, further comprising a second optical element, wherein the second optical element comprises a lens array with m1 lenslets or collimator element, wherein the m1 lenslet or collimator element are configured downstream of the n1 first light generating devices and upstream of the first optical element, wherein m1=n1.

8. The light generating system according to claim 1, further comprising a second set of light generating devices comprising n2 second light generating devices, wherein:

the second light generating devices are configured to generate second device light;

the n2 second light generating device of the second set of light generating devices are divided into k2 second subsets, wherein n2≥3 and 2≤k2≤n2;

the luminescent body has a transmission for perpendicularly provided second device light of at least 65%;

the n2 second light generating devices and the first optical element are configured to provide second beams of second device light to the luminescent body, wherein two or more second beams of two or more second light generating devices from two or more different second subsets of the k2 second subsets have different second angles of incidence (α2) relative to the normal to the luminescent body; and in an operational mode of the light generating system a second intensity of the second device light of the k2 second subsets is dependent upon the second angles of incidence (α2).

9. The light generating system according to claim 8, wherein in the operational mode the second intensity of the second device light of the k2 second subsets decreases with increasing second angle of incidence (α2).

10. The light generating system according to claim 9, further comprising a third optical element, wherein the third optical element comprises a beam combiner, wherein the third optical element is configured downstream of the n1 first light generating devices and the n2 second light generating devices, and upstream of the first optical element, and wherein the third optical element is configured to combine the first device light and the second device light.

11. The light generating system according to claim 8, wherein one or more of the following applies: (i) the n1 first light generating devices comprise vertical-cavity surface-emitting lasers, and (ii) the n2 second light generating devices comprise vertical-cavity surface-emitting lasers; and wherein the n2 second light generating devices are configured to provide second device light having a wavelength in the range of 605-780 nm.

12. A light generating device selected from the group of a lamp, a luminaire, a projector device, a disinfection device, and an optical wireless communication device, comprising the light generating system according to claim 1.

13. The light generating device according to claim 12, wherein:

the n1 first light generating devices comprise lasers; and the light generating device is configured to generate white light having a CCT selected from the range of 2700-4000 K and having a CRI of at least 80.

14. A light generating system comprising: (i) a first set comprising n1 first light generating devices, (ii) a first optical element, and (iii) a luminescent body, wherein:

the n1 first light generating devices are configured to generate first device light; wherein the n1 first light generating devices are selected from the group of lasers and super luminescent diodes, and wherein the n1 first light generating devices are configured to generate first device light having a wavelength selected from the range of 380-495 nm;

the first set comprises k1 first subsets of each at least one first light generating device of the n1 first light generating devices, wherein n1≥3, and 2≤k1≤n1;

the luminescent body is configured to: (i) convert part of the first device light into luminescent material light, and (ii) transmit part of the first device light;

the n1 first light generating devices and the first optical element are configured to provide first beams of first device light to the luminescent body, wherein two or more first beams of two or more first light generating devices from two or more different first subsets of the k1 first subsets have different first angles of incidence (α1) relative to a normal to the luminescent body;

in an operational mode of the light generating system a first intensity of the first device light of the k1 first subsets increases with increasing first angle of incidence (α1);

wherein the luminescent body has an upstream face, configured in a light receiving relationship with the n1 first light generating devices, and a downstream face from which during the operational mode (a) first device light after transmission through the luminescent body, and (b) luminescent material light, escape, wherein the light generating system is configured to generate system light, wherein in the operational mode the system light comprises the first device light and the luminescent material light, wherein the first angles of incidence (α1) and the first intensities in the operational mode are selected such that in a plane perpendicular to the downstream side over an angle β of at least 90° a color variation in u' or a color variation in v' over the angle is at maximum 0.03.

15. The light generating system according to claim 14, wherein the luminescent body comprises a luminescent material, and wherein the luminescent material comprises a luminescent material of the type $A_3B_5O_{12}$: Ce, wherein A comprises one or more of Y, La, Gd, Tb and Lu, and wherein B comprises one or more of Al, Ga, In and Sc.

* * * * *